Patented Dec. 5, 1944

2,364,351

UNITED STATES PATENT OFFICE 2,364,351

QUINAZOLINE AZO COMPOUNDS

Joseph B. Dickey, Rochester, N. Y., assignor to Eastman Kodak Company, Rochester, N. Y., a corporation of New Jersey No Drawing. Application September 17, 1942, Serial No. 458,723

5 Claims. (Cl. 260—154)

This invention relates to new azo compounds and their application to the art of dyeing or coloring. Textile materials such as organic derivatives of cellulose, wool, silk, cotton, viscose, nylon and casein wool and lacquers composed of cellulose esters and cellulose ethers, for example, can be colored. Coloration can be effected by dyeing, printing, stenciling or other suitable methods.

Typical organic derivatives of cellulose include the hydrolyzed as well as the unhydrolyzed cellulose organic acid esters such as cellulose acetate, cellulose formate, cellulose propionate or cellulose butyrate, and the hydrolyzed as well as the unhydrolyzed mixed organic acid esters of cellulose, such as cellulose acetate-propionate, cellulose acetate-butyrate, and the cellulose ethers, such as methyl cellulose, ethyl cellulose or benzyl cellulose.

It is an object of my invention to provide a new class of azo compounds. Another object of my invention is to provide colored textile materials which are of good fastness to light and washing. A further object is to provide a process for the direct coloration of organic derivatives of cellulose, wool, silk, cotton, viscose, nylon and casein wool textile materials. A particular object of my invention is to provide a new class of nuclear nonsulfonated azo compounds suitable for the coloration of cellulose acetate. A still further object is to provide a satisfactory process for the preparation of the new azo compounds of my invention.

The azo compounds by means of which the above objects are accomplished or made possible consist of the azo compounds having the formula:

R—N=N—Q wherein R stands for the residue of an aromatic nucleus and Q stands for the residue of a tetrahydroquinazoline nucleus substituted in its 1-position with a member selected from the group consisting of an alkyl group, a hydroxyalkyl group, an alkoxyalkyl group, a halogenoalkyl group, a cyanoalkyl group, a sulfoalkyl group, a sulfatoalkyl group, a phosphatoalkyl group, a phosphitoalkyl group, a cycloalkyl group and a furfuryl group, said tetrahydroquinazoline nucleus being joined to the azo bond shown through the carbon atom in its 6-position.

For purposes of clarity it is here noted that tetrahydroquinazoline has the formula:

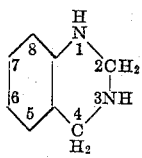

The numbering indicated above is that used in the specification and claims when referring to the 1-(alkyl, cycloalkyl, furfuryl, etc.)-tetrahydroquinazoline compounds of the invention.

Ordinarily R is an aryl nucleus of the benzene series. Similarly, Q is ordinarily a 1-alkyltetrahydroquinazoline nucleus which may or may not contain other substituents.

Compounds wherein R is a benzene nucleus containing a nitro group in para position to the azo bond and Q is a 1-hydroxyalkyltetrahydroquinazoline nucleus would appear to be advantageous. Thus, compounds having the formula:

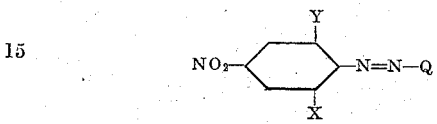

wherein X stands for a member selected from the group consisting of hydrogen, a nitro group and a halogen atom, Y stands for a member selected from the group consisting of hydrogen, a nitro group, a halogen atom, a cyano group, a hydroxyl group, an alkyl group, an alkoxy group, an alkylketo group, an alkylsulfone group and a sulfonamide group and Q stands for the residue of a 1-hydroxyalkyltetrahydroquinazoline nucleus, free of sulfonic and carboxylic acid groups, joined to the azo bond shown through the carbon atom in its 6-position, are believed to be among the most valuable of the compounds of my invention especially insofar as the dyeing of cellulose acetate is concerned.

Typical groups which can be substituted in the 1-position of the tetrahydroquinazoline nucleus include hydrocarbon alkyl groups such as the methyl group, the ethyl group, a propyl group or a butyl group and also substituted alkyl groups, such as β-hydroxyethyl, β-hydroxypropyl, β,γ-dihydroxypropyl, Δ-hydroxybutyl and the ethers thereof such as β-methoxyethyl, β-ethoxyethyl, Δ-methoxybutyl and γ-methoxypropyl as well as the esters thereof such as the methyl or ethyl esters. Similarly, alkyl groups substituted by halogen or cyano, such as β-chloroethyl, γ-chloropropyl, β-iodoethyl, β-cyanoethyl and γ-cyanopropyl are included. Further, alkyl groups substituted with a sulfonic, sulfato or acid ester of phosphorus group such as β-sulfoethyl, γ-sulfopropyl, β-sulfatoethyl, γ-sulfatopropyl, Δ-sulfatobutyl, β-phosphatoethyl, γ-phosphatopropyl and γ-phosphitopropyl are likewise included.

Illustrative cycloalkyl groups include cyclohexyl, cyclobutyl, and cycloheptyl. As illustrative of "a furfuryl group" may be mentioned furfuryl, tetrahydrofurfuryl, 5-ethylfurfuryl, 5-β-hydroxyethyltetrahydrofurfuryl and 5-ethyltetrahydrofurfuryl.

Both sulfonated and non-sulfonated compounds are included within the scope of my invention. The nuclear non-sulfonated compounds have been found to be especially of value for the dyeing of organic derivatives of cellulose, especially cellulose acetate, and it is to these compounds and their application for the dyeing of organic derivatives of cellulose that my invention is especially directed. These nuclear non-sulfonated compounds likewise possess some application for the dyeing of wool, silk and nylon. For the dyeing of cellulose acetate, nuclear non-sulfonated dye compounds wherein R is the residue of a benzene nucleus are generally advantageous.

The nuclear sulfonated compounds of my invention have little or no utility for the dyeing of organic derivatives of cellulose but possess application for the dyeing of wool, silk, nylon, cotton, viscose, and casein wool. Preferably, when the dye compounds of the invention are to be employed for the coloration of organic derivatives of cellulose, they should contain no nuclear free carboxylic acid group. Blue, blue-green, bluish-red, orange-red, red and rubine colors, for example, can be obtained using the dye compounds of the invention.

The azo compounds of the invention can be prepared by diazotizing diazotizable aromatic amines and coupling the diazonium compounds obtained with a tetrahydroquinazoline compound, substituted in its 1-position with a member selected from the group consisting of an alkyl group, a cycloalkyl group, and a furfuryl group, having no substituent which would prevent coupling.

The following examples illustrate the preparation of the azo compounds of my invention:

*Example 1*

.1 gram mole of 1-amino-2,4-dinitrobenzene-6-sulfonethylamide is diazotized at a temperature of 0–5° C. with nitrosyl sulfuric acid in the usual manner. The diazonium solution resulting is poured into water and the insoluble diazo compound which precipitates out is recovered by filtration, and then dissolved in acetic acid.

.1 gram mole of 1,3-di-β-hydroxyethyl-7-methyltetrahydroquinazoline is dissolved in glacial acetic acid and the resulting solution is cooled to a temperature of 0–10° C. The diazo solution prepared as described above is then added with stirring while maintaining a temperature of 0–10° C. The coupling reaction which takes place is permitted to go to completion by letting the reaction mixture stand for some time and then making it neutral to Congo red paper by the addition of sodium acetate. The dye compound formed is recovered by filtration, washed with water and dried. The dye compound obtained has the formula:

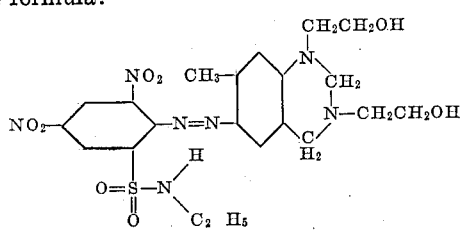

and colors cellulose acetate silk blue from an aqueous suspension. Wool, silk and nylon are similarly dyed blue by this dye compound.

*Example 2*

.1 gram mole of 1-amino-2-chloro-4-nitrobenzene is diazotized in known fashion and the diazonium compound obtained is added slowly with stirring to an aqueous hydrochloric acid solution of 1,3-di-β-hydroxyethyl-7-methyltetrahydroquinazoline which has been cooled to a temperature of 0–10° C. Throughout the coupling reaction which takes place, the reaction mixture is maintained at a temperature of 0–10° C. After complete addition of the diazonium compound, the reaction mixture is permitted to stand for some time after which it is made neutral to Congo red paper by adding sodium acetate. The dye compound formed is recovered by filtration, washed with water and dried. The dye compound obtained has the formula:

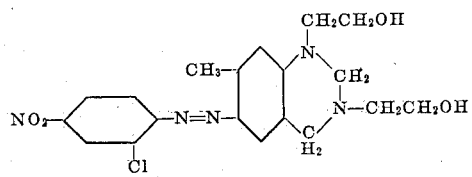

and colors cellulose acetate, wool, silk and nylon a rubine shade from an aqueous suspension.

*Example 3*

.1 gram mole of 1-amino-2-chloro-4,6-dinitrobenzene is diazotized in known fashion and the diazonium compound obtained is coupled in accordance with the procedure described in Example 2 with .1 gram mole of 1,3-di-β-hydroxyethyltetrahydroquinazoline. The dye compound has the formula:

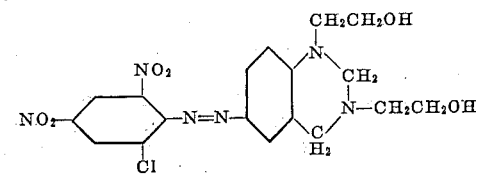

and colors cellulose acetate, wool, silk and nylon reddish-blue.

*Example 4*

.1 gram mole of p-nitroaniline is diazotized and the diazonium compound obtained is coupled in accordance with the procedure described in Example 2 with .1 gram mole of 1,3-ditetrahydrofurfuryltetrahydroquinazoline. The dye compound obtained has the formula:

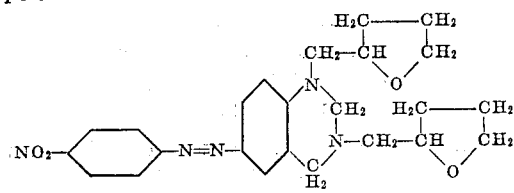

and colors cellulose acetate, wool, silk and nylon rubine.

*Example 5*

.1 gram mole of 2-amino-6-methoxybenzothiazole is diazotized and the diazonium compound obtained is coupled in accordance with the procedure described in Example 2 with .1 gram of 1,3 - di - β - hydroxyethyltetrahydroquinazoline. The dye compound obtained has the formula:

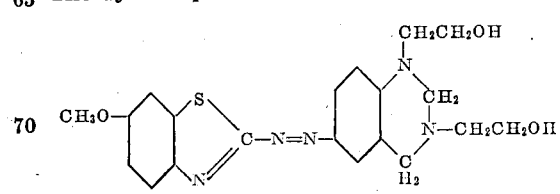

and colors cellulose acetate, wool, silk and nylon red.

Example 6

.1 gram mole of p-nitroaniline is diazotized and the diazonium compound obtained is coupled with .1 gram mole of

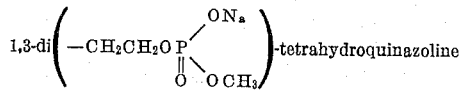

The dye compound obtained colors cellulose acetate, wool, silk and nylon red.

Example 7

.1 gram of 1-amino-2-chloro-4-nitrobenzene is diazotized and the diazonium compound obtained is coupled with .1 gram mole of 1-cyclohexanol-3-β-hydroxyethyltetrahydroquinazoline. The dye compound obtained colors cellulose acetate, wool, silk and nylon rubine.

Example 8

.1 gram mole of p-aminoazobenzene is diazotized and the diazonium compound obtained is coupled with .1 gram mole of 1,3-di-β-methoxyethyltetrahydroquinazoline. The dye compound obtained colors cellulose acetate, wool, silk and nylon red.

Example 9

.1 gram mole of α-naphthylamine is diazotized and the diazonium compound obtained is coupled with .1 gram mole of 1,3-di-β-hydroxyethyl-7-acetaminotetrahydroquinazoline. The dye compound obtained colors cellulose acetate, wool, silk and nylon rubine.

Example 10

.1 gram mole of 1-amino-2-sulfonic-4-nitrobenzene is diazotized in known fashion and the diazonium compound obtained is added to a dilute hydrochloric acid solution of .1 gram of 1,3-di-β-hydroxyethyl-7-ethyltetrahydroquinazoline. The coupling reaction which takes place is carried out while stirring and maintaining a temperature of 0–10° C. The coupling reaction is completed by adding sodium hydroxide and the reaction mixture is made neutral to Congo red paper following which the dye compound is precipitated by adding sodium chloride and then recovered by filtration, washed with water and dried. The dye compound obtained colors wool, silk, nylon, cotton, viscose and casein wool rubine.

Example 11

.1 gram mole of 1-amino-2-carboxyl-4-nitrobenzene is diazotized and the diazonium compound obtained is coupled as described in Example 10 with .1 gram mole of 1,3-dimethyltetrahydroquinazoline. The dye compound obtained colors the materials named in Example 10 rubine.

Example 12

.1 gram mole of 1-amino-5-hydroxynaphthalene is diazotized and the diazonium compound obtained is coupled in accordance with the procedure described in Example 10 with .1 gram mole of 1,3-di-β-sodiumsulfatoethyltetrahydroquinazoline. The dye compound obtained colors the materials named in Example 10 reddish-blue.

Example 13

.1 gram mole of 1-amino-8-naphthol-4-sulfonic acid is diazotized and the diazonium compound obtained is coupled with .1 gram mole of 1,3-di-β-hydroxyethyltetrahydroquinazoline. Coupling and recovery of the dye compound can be carried out in accordance with the procedure described in Example 10. The dye compound obtained colors the materials named in Example 10 reddish-blue.

The following tabulation further illustrates the compounds included within the scope of my invention. The compounds indicated below may be prepared by diazotizing the amines listed under the heading "Amine" and coupling the diazonium compounds obtained with the compounds specified in the column entitled "Coupling component." The diazotization and coupling reactions may be carried out following the procedure described in the foregoing examples. The color given is that yielded by the dye on the materials which it is adapted to color. These materials have been indicated hereinbefore.

| Amine | Coupling component | Color |
|---|---|---|
| p-Nitroaniline | 1,3-di-β-hydroxyethyltetrahydroquinazoline | Bluish-red. |
| Do | 1-β,γ-dihydroxypropyl-3-acetyl-7-methyltetrahydroquinazoline | Rubine. |
| 1-amino-2-chloro-4-nitrobenzene | 1-β,γ-dihydroxypropyl-3-methyl-7-methoxytetrahydroquinazoline | Bluish-rubine. |
| Do | 1,3-di-β-hydroxyethyl-2-methyltetrahydroquinazoline | Rubine. |
| 1-amino-2-bromo-4-nitrobenzene | 1,3-di-β-hydroxypropyl-5,8-dimethoxytetrahydroquinazoline | Do. |
| p-Aminoacetophenone | 1-[CH₂CH₂—O—P(ONa)(=O)(O—phenyl)]-3-methyltetrahydroquinazoline | Orange. |
| 1-amino-2,4-dinitrobenzene | 1-β-hydroxy-β-ethoxyethyltetrahydroquinazoline | Violet. |
| 2-amino-5-nitrobenzenesulfonic acid | 1-furfuryltetrahydroquinazoline | Rubine. |
| 2-amino-5-nitrobenzoic acid | 1,3-dimethyltetrahydroquinazoline | Do. |
| 2-amino-3,5-dinitrophenylmethylsulfone | 1-β-sulfatopropyltetrahydroquinazoline | Blue. |
| 2-aminobenzothiazole-6-sulfonic acid | 1-cyclohexyl-3-β-hydroxyethyltetrahydroquinazoline | Do. |
| 2-aminobenzothiazole | 1,3-di-β-hydroxyethyltetrahydroquinazoline | Do. |
| 2-aminobenzoxazole | ----do---- | Red. |
| 2-amino-6-methoxybenzoxazole | ----do---- | Do. |
| 1-amino-2-cyano-4-nitrobenzene | 1-β-hydroxyethyl-3-allyltetrahydroquinazoline | Rubine. |
| 1-amino-2-hydroxy-4-nitrobenzene | 1-β-hydroxypropyl-2-ethyltetrahydroquinazoline | Magenta. |
| 1-amino-2-methoxy-4-nitrobenzene | 1-β-hydroxyethyl-3-phenyltetrahydroquinazoline | Rubine. |
| 1-amino-2-methyl-4-nitrobenzene | 1-γ-hydroxypropyl-3-(4′-methylphenyl)tetrahydroquinazoline | Do. |
| 2-amino-5-nitrophenylmethylketone | 1-β,γ-dihydroxypropyl-2-(4′-hydroxyphenyl)tetrahydroquinazoline | Do. |
| 2-amino-5-nitrophenylethylsulfone | 1-β-hydroxyethyl-2-(3′-nitrophenyl)tetrahydroquinazoline | Do. |
| 2-amino-nitrophenylsulfonamide | 1,3-di-β-hydroxyethyltetrahydroquinazoline | Do. |

It will be understood that the foregoing examples are intended to be illustrative and not limitative of my invention. The diazonium compounds of any of the amines indicated herein can be coupled, for example, with any of the 1-(alkyl, cycloalkyl or furfuryl)-tetrahydroquinazoline compounds disclosed herein to yield dye compounds of the invention. Additional aromatic amines that can be employed include, for example, o-chloroaniline, m-sulfanilic acid, p-sulfanilic acid, 4-amino-5-nitrobenzenesulfonic acid, 4-amino-5-chlorobenzenesulfonic acid, 2- amino-5-bromobenzenesulfonic acid, 3-amino-4-hydroxy-6-chlorobenzenesulfonic acid, 3-amino-4-hydroxy-5-chlorobenzenesulfonic acid, 3-amino-4-hydroxy-6-methylbenzenesulfonic acid, 1-amino-2,4-dinitronaphthalene, 1-amino-2,4-dinitro-6-hydroxybenzene, 1-a m i n o-2-naphthol-4-sulfonic acid, 2-amino-5-n a p h t h o l-4-sulfonic acid, 1-naphthylamine-6,8-disulfonic acid, 4-amino-4′-nitroazobenzene, 4-amino-4′-sulfoazobenzene and 4-amino-2′-chloro-4′-nitroazobenzene.

In order that the preparation of the azo compounds of my invention may be clearly understood the preparation of the tetrahydroquinazoline coupling components used in their manufacture is given hereinafter. These 1-(alkyl, cycloalkyl or furfuryl)-tetrahydroquinazoline compounds are, so far as I am aware, new compounds. However, they can be prepared from the known quinazoline compounds by the methods described hereinafter.

Quinazoline compounds from which the tetrahydroquinazoline coupling components of the invention can be directly prepared by introduction of an alkyl, cycloalkyl or furfuryl group in the 1-position or by reduction to the tetrahydroquinazoline form and subsequent introduction of an alkyl, cycloalkyl or furfuryl group are disclosed, for example, in Berichte der Deutschen Chemischen Gesellschaft, vol. 23, pages 2807–2814; vol. 24, pages 3091–3098; vol. 25, pages 3030–3039; vol. 29, pages 1313–1315; vol. 36, pages 800–813 and vol. 37, pages 3643–3651, as well as Journal für Praktische Chemie (2), vol. 48, pages 537–575 and (2), vol. 53, pages 418–425. The preparation of representative 1-(alkyl, cycloalkyl or furfuryl)-tetrahydroquinazoline compounds is indicated hereinafter.

A. *Preparation of 1-β-hydroxyethyltetrahydroquinazoline*

3,4-dihydroquinazoline is acetylated to 3-acetyl-3,4-dihydroquinazoline with acetic anhydride and then reduced to 3-acetyltetrahydroquinazoline by means of hydrogen and Raney nickel at room temperature. The resulting product is then heated with ethylene oxide in a suitable reaction vessel at 160° C. to give 1-β-hydroxyethyl-3-acetyl-tetrahydroquinazoline from which the desired compound can be obtained by warming with dilute hydrochloric acid or with alcoholic sodium hydroxide.

B. *Preparation of 1-tetrahydrofurfuryl-tetrahydroquinazoline*

3-acetyltetrahydroquinazoline is charged into an autoclave with an equivalent amount of tetrahydrofurfural and reduced with hydrogen in the presence of Raney nickel in an ethanol medium at room temperature. When the reduction reaction is complete, the reaction product is removed and the desired product obtained by eliminating the acetyl group as in A.

C. *Preparation of 1-cyclohexanoltetrahydroquinazoline*

3-acetyltetrahydroquinazoline is heated in dioxane at 180° C. with 1.1 equivalents of cyclohexane oxide for 6 hours. The reaction product 1-cyclohexanol-3-acetyltetrahydroquinazoline is treated as in A to eliminate the acetyl group leaving 1-cyclohexanoltetrahydroquinazoline.

D. *Preparation of 1,3-di-β-methoxyethyltetrahydroquinazoline* o-nitrobenzylamine is reacted with β-methoxyethyl chloride or β-methoxyethyl sulfate to yield o-nitrobenzyl-mono-β-methoxyethylamine which in turn is reduced to o-amidobenzyl-mono-β-methoxyethylamine and this latter compound is reacted with formic acid to form the formyl derivative which upon reduction yields 3-β-methoxyethyl-3,4-dihydroquinazoline. The resulting compound, upon further reduction, in accordance with the procedure described in Berichte 34, 811, y i e l d s 3-β-methoxyethyltetrahydroquinazoline. The 3-β-methoxyethyltetrahydroquinazoline is, in turn, converted to 1,3-di-β-methoxyethyltetrahydroquinazoline by reacting it with β-methoxyethylchloride or sulfate.

E. *Preparation of 1-β,γ-dihydroxypropyl-3-acetyltetrahydroquinazoline*

3-acetyltetrahydroquinazoline is treated in dioxane with 1.1 equivalents of glycidol for 8 hours at 50° C. Upon completion of the reaction the dioxane is removed leaving the desired product.

From Examples A to E, inclusive, the formation of the 1-(alkyl, cycloalkyl or furfuryl)-tetrahydroquinazolines used in the preparation of the azo compounds of my invention will be apparent. In general a tetrahydroquinazoline compound containing a group blocking the 3-position is treated with an agent adapted to replace a hydrogen attached to a nitrogen atom. It will be understood that hydroxyalkyl groups can be introduced by treatment with alkylene oxides such as ethylene oxide, propylene oxide trimethylene oxide and butylene oxide depending on the particular hydroxyalkyl group desired. Cycloalkyl and furfuryl groups can be introduced by treatment with cycloalkyl chlorides and bromides and furfuryl chlorides and bromides, respectively. Unsubstituted alkyl groups can be introduced by treatment with alkyl halides, such as methyl chloride, ethyl bromide, propyl chloride, and butyl chloride.

As will be understood the benzene nucleus of these tetrahydroquinazoline compounds can be substituted with a substituent such as an alkyl hydrocarbon group, an alkoxy group, an acylamino group and a halogen atom. The preparation of various such tetrahydroquinazoline compounds is indicated hereinafter.

7-methyltetrahydroquinazoline, 7-acetaminotetrahydroquinazoline, 7-methoxytetrahydroquinazoline, 7-chlorotetrahydroquinazoline and 5,8-dimethoxytetrahydroquinazoline, for example, can be prepared by reacting 2-nitro-4-methyl-N-formylbenzylamine.

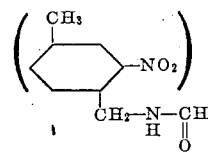

2-nitro-4-acetamino-N-formylbenzylamine, 2-nitro-4-methoxy-N-formylbenzylamine, 2-nitro-4-chloro-N-formylbenzylamine and 2-nitro-3,6-dimethoxy-N-formylbenzylamine, respectively, just as 2-nitro-N-formylbenzylamine is reacted in Berichte, vol. 36, page 811 to prepare 3,4-dihydroquinazoline and hydrogenating the 3,4-dihydroquinazoline compounds obtained to form the desired tetrahydroquinazoline compounds, which may in turn be treated to introduce an alkyl, cycloalkyl or furfuryl group into the 1-position.

Additional tetrahydroquinazoline compounds that can be employed in the preparation of the tetrahydroquinazoline coupling compounds of the invention include:

Tetrahydroquinazoline
  Berichte 36, 811
2-phenyltetrahydroquinazoline
  Berichte 25, 3033
2-ethyltetrahydroquinazoline
  Berichte 25, 3038
3-phenyltetrahydroquinazoline
  Journal fur Praktische Chemie (2) 48, 548–549
3-(4'-ethoxyphenyl) tetrahydroquinazoline
  Journal fur Praktische Chemie (2), 48, 560–561
3-(3'-aminophenyl) tetrahydroquinazoline
  Journal fur Praktische Chemie (2), 48, 567–568
3-allyltetrahydroquinazoline
  Journal fur Praktische Chemie (2), 48, 574–575
3-(4'-methylphenyl) tetrahydroquinazoline
  Journal fur Praktische Chemie (2), 53, 421
3-(2'-methylphenyl) tetrahydroquinazoline
  Journal fur Praktische Chemie (2), 421–422
3-(2'-methoxyphenyl) tetrahydroquinazoline
  Journal fur Praktische Chemie (2), 423
2-(3'-nitrophenyl) tetrahydroquinazoline
  Journal fur Praktische Chemie (2), 424
2-(4'-hydroxyphenyl) tetrahydroquinazoline
  Journal fur Praktische Chemie (2), 425
2-methyltetrahydroquinazoline
  Berichte 36, 812

It will be apparent that when the tetrahydroquinazoline coupling compounds of my invention are prepared from tetrahydroquinazoline compounds unsubstituted in either of their nuclear nitrogen atoms it is possible to obtain tetrahydroquinazoline compounds wherein both of the 1 and 3 positions contain the same substituent. Thus, 1,3-di-β-hydroxyethyltetrahydroquinazoline can be prepared by reacting tetrahydroquinazoline with sufficient ethylene oxide to introduce a β-hydroxyethyl group in each of the 1 and 3 positions.

Where 3,4-dihydroquinazoline compounds unsubstituted in the 3 or 4 position are the starting materials, the 3-position can be blocked by acetylation and the compound reduced to its 3-acetyltetrahydroquinazoline form. An alkyl, cycloalkyl or furfuryl group is then introduced into the 1-position following which the acetyl group is split off if it is desired to either have the 3-position free or to introduce another group. If another group is introduced into the 3-position it may be the same or different from that introduced into the 1-position. Thus, 1-ethyl-3-β-hydroxyethyltetrahydroquinazoline, 1-cyclohexyl-3-β,γ-dihydroxypropyltetrahydroazoline, 1-furfuryl-3-β-hydroxypropyltetrahydroquinazoline, 1-γ-hydroxypropyl-3-β-hydroxyethyltetrahydroquinazoline, 1-β-hydroxyethyl-3-tetrahydrofurfuryltetrahydroquinazoline, 1-β-hydroxyethyl-2-phenyl-3-β-hydroxyethyltetrahydroquinazoline, 1,2-diethyl-3-β-hydroxyethyltetrahydroquinazoline, 1-β-hydroxyethyl-2-methyl-3-ethyltetrahydroquinazoline, 1-ethyl-3-cyclohexyltetrahydroquinazoline and 1-β-hydroxyethyl-3-allyltetrahydroquinazoline can be prepared. Naturally, the preparation of the above-named compounds is not limited to the method just indicated as any other methods yielding them can be used.

From the foregoing information concerning the preparation of tetrahydroquinazoline compounds it will be understood that the tetrahydroquinazoline compounds tabulated hereinbefore, which contain no alkyl, cycloalkyl or furfuryl group in the 1-position, can be treated to introduce any of the groups just named into the 1-position. Further, the manner of introducing alkyl groups in salt form such as alkyl-(sulfonic, sulfato, phosphato and phosphito) groups is well known to the art. Alkyl phosphato groups can be introduced, for example, by methods described in McNally and Dickey application Serial No. 225,198, filed August 16, 1938.

The preparation of various tetrahydroquinazoline coupling compounds employed in the manufacture of the dye compounds of the examples is indicated hereinafter:

1,3-di-β-hydroxyethyl-7-methyltetrahydroquinazoline can be prepared by reacting 7-methyltetrahydroquinazoline with sufficient ethylene oxide to introduce two β-hydroxyethyl groups.

1,3-ditetrahydrofurfuryltetrahydroquinazoline— react tetrahydroquinazoline with tetrahydrofurfural and hydrogen in the presence of Raney nickel.

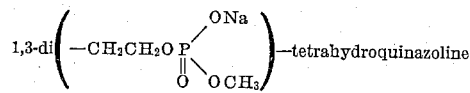

react 1,3-di-β-hydroxyethyltetrahydroquinazoline with

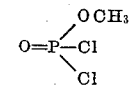

and hydrolyze with sodium hydroxide.

1-cyclohexanol-3-β-hydroxyethyltetrahydroquinazoline—react 1-cyclohexanoltetrahydroquinazoline with ethylene oxide.

1,3-dimethyltetrahydroquinazoline—react tetrahydroquinazoline with methyl sulfate or methyl iodide.

1,3-di-β-sodium sulfatoethyltetrahydroquinazoline—react 1,3-di-β-hydroxyethyltetrahydroquinazoline with chlorosulfonic acid.

The azo compounds of my invention are, for the most part, relatively insoluble in water and, accordingly, they may be advantageously directly applied to the material undergoing coloration in the form of an aqueous suspension which can be prepared by grinding the dye to a paste in the presence of a sulfonated oil, soap, or other suitable dispersing agent and dispersing the resulting paste in water. Where the dye possesses a sulfonic acid group or other water-solubilizing group it may possess sufficient solubility in water as to render the use of a dispersing agent unnecessary. Generally speaking, however, the use of a dispersing agent is desirable.

Direct dyeing operations can, with advantage, be conducted at temperatures of about 75–85° C. but any suitable temperature may be used. Thus, the textile material to be dyed or colored is ordinarily added to the dyebath at a temperature lower than that at which the main portion of the dyeing is to be effected, a temperature approximating 45–55° C., for example, following which the temperature is raised to that selected for carrying out the dyeing operation. The temperature at which the dyeing is conducted may, of course, be varied somewhat depending upon the particular material undergoing coloration. As is understood by those skilled in the art, the intensity of dyeing can be varied by varying the proportion of dye to material undergoing coloration. Generally speaking, 1-3% by weight of dye to material is employed although any desired proportions can be used.

Suitable dispersing agents together with the amounts that may be employed are disclosed in McNally and Dickey Patent No. 2,115,030, issued April 26, 1938. The process disclosed in this patent for the dyeing of cellulose acetate silk can be used in applying the dyes of the present application to this material.

It will be understood that textile materials prepared from other organic derivatives of cellulose, wool, silk, cotton, viscose, Nylon and casein wool or mixtures of these materials can be directly colored from an aqueous dyebath in a similar manner as cellulose acetate. However, other suitable methods for the dyeing of these materials are known to those skilled in the art and these methods of course can be used in applying the dye compound of this invention if desired. Where lacquers composed of cellulose esters and cellulose ethers, for example, are to be colored, the dye compounds of the invention may be applied to these materials by the methods employed in the art for their coloration.

It is here noted that the term "nylon" refers to a nuclear polyamide resin which is believed to be basically described or claimed in U. S. Letters Patent No. 2,071,250, issued February 16, 1937, to Wallace H. Carothers.

I claim:

1. The azo compounds having the formula:

wherein R stands for a nucleus selected from the group consisting of nuclei of the benzene series, nuclei of the naphthalene series, nuclei of the benzoxazole series and nuclei of the benzothiazole series, Q stands for the residue of a tetrahydroquinazoline nucleus substituted in its 1-position by a member selected from the group consisting of an alkyl group, a hydroxyalkyl group, an alkoxyalkyl group, a halogenoalkyl group, a cyanoalkyl group, a sulfoalkyl group, a sulfatoalkyl group, a phosphatoalkyl group, a phosphitoalkyl group, a cycloalkyl group and a furfuryl group, said tetrahydroquinazoline nucleus being joined to the azo bond through the carbon atom in its 6-position and said benzoxazole and benzothiazole nuclei being joined to the azo bond through the carbon atom in the α-position.

2. The azo compounds having the formula:

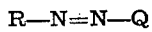

wherein R stands for an aryl nucleus of the benzene series and Q stands for the residue of a tetrahydroquinazoline nucleus substituted in its 1-position with a hydroxyalkyl group, said tetrahydroquinazoline nucleus being joined to the azo bond through the carbon atom in its 6-position.

3. The azo compound having the formula:

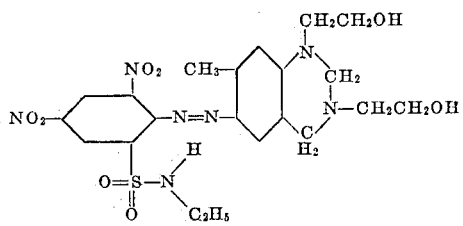

4. The azo compound having the formula:

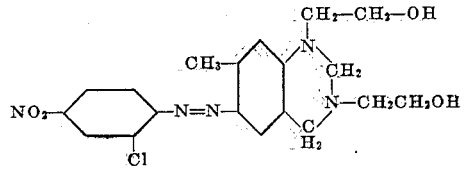

5. The azo compound having the formula:

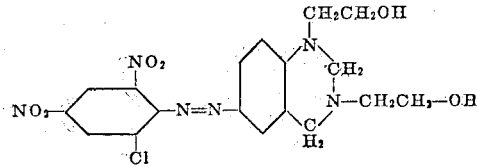

JOSEPH B. DICKEY.